United States Patent [19]
Berg et al.

[11] Patent Number: 5,720,404
[45] Date of Patent: Feb. 24, 1998

[54] FEMALE-MOLDED UNDERGROUND STORAGE TANK AND METHOD OF MAKING

[75] Inventors: Robin Berg, Hudson, Wis.; John Burwell, Eagan, Minn.; Neil Olson, Edina, Minn.; John Smith, Burnsville, Minn.

[73] Assignee: Xerxes Corporation, Minneapolis, Minn.

[21] Appl. No.: 705,765

[22] Filed: Aug. 30, 1996

[51] Int. Cl.$^6$ .................................................. B65D 90/04
[52] U.S. Cl. .................. 220/4.13; 220/469; 220/445; 73/49.2; 156/155; 405/53
[58] Field of Search .................. 220/4.13, 453, 220/445, 469, 454; 156/155; 73/49.2; 405/53, 55

[56] References Cited

U.S. PATENT DOCUMENTS

| | | | |
|---|---|---|---|
| 4,869,386 | 9/1989 | Sharp | 220/469 |
| 4,925,046 | 5/1990 | Sharp | 220/469 |
| 4,995,528 | 2/1991 | Sharp | 220/469 |
| 5,017,044 | 5/1991 | Sharp | 220/469 |
| 5,115,936 | 5/1992 | Bartlow | 220/469 |
| 5,220,823 | 6/1993 | Berg et al. | |
| 5,303,840 | 4/1994 | Sharp | 220/469 |
| 5,462,191 | 10/1995 | Bartlow et al. | 220/469 |

*Primary Examiner*—Joseph M. Moy
*Attorney, Agent, or Firm*—Oblon, Spivak, McClelland, Maier & Neustadt, P.C.

[57] ABSTRACT

A female-molded double-walled underground storage tank is provided with an annulus of reduced thickness, defined by a plastic film. The film separates the inner and outer walls of the tank, providing an annulus which can be monitored to monitor the tank for failure of either the inner or the outer tank, before contamination of the exterior environment. The tank is formed of fiberglass reinforced plastic, the inner and outer walls thereof being tied together by fiberglass reinforced plastic which holds the annular film in place. The domes of the outer and inner shell are separated due to a layer of wax and alcohol applied to the inner surface of the dome of the exterior tank prior to formation of the interior tank. The spaces between the flats of the two tanks, the domes of the two tanks, and the interior of the ribs of the exterior tank are placed in fluid communication by gutters running along the length of the tank.

13 Claims, 4 Drawing Sheets

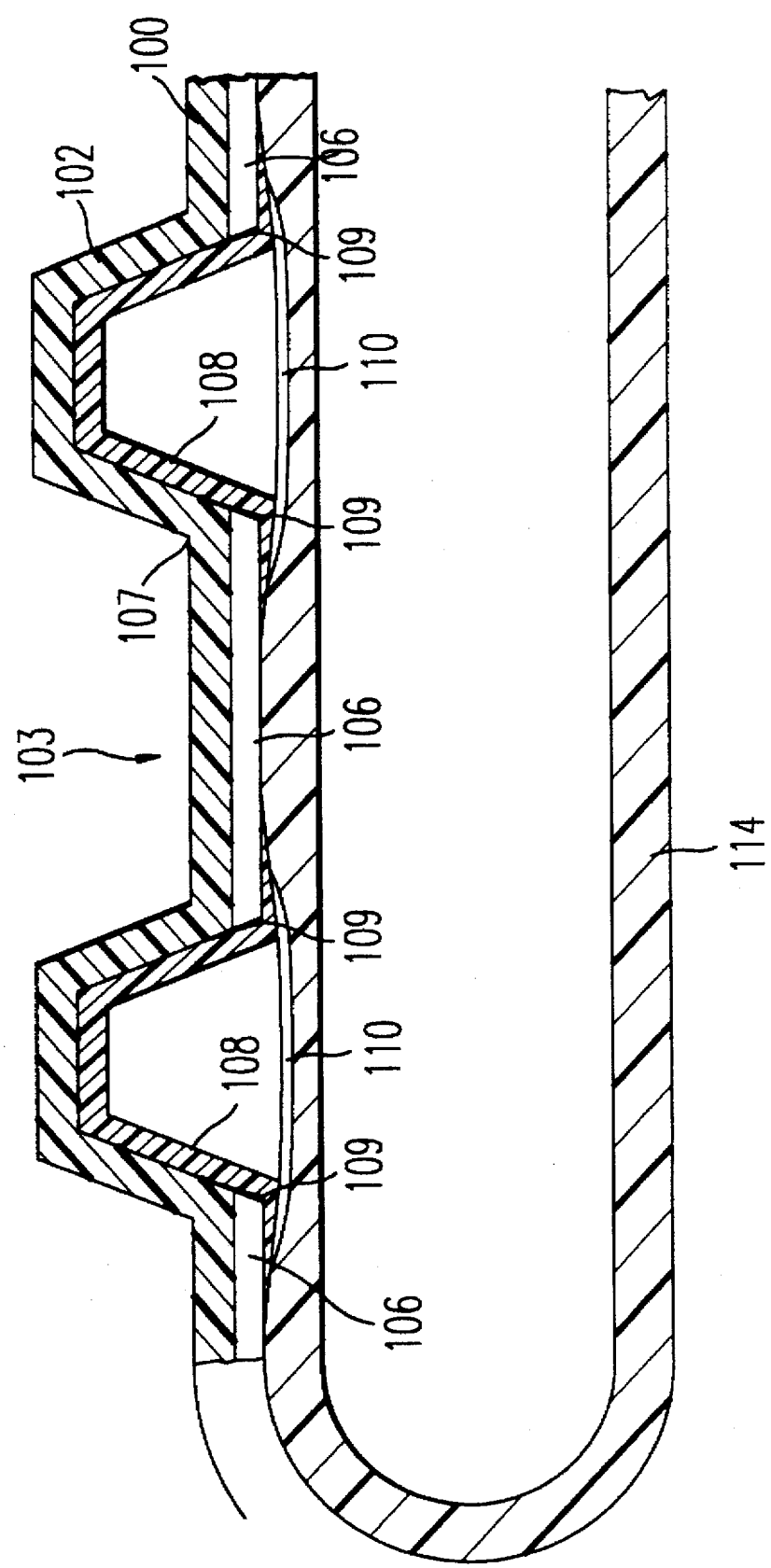

5,720,404

FEMALE-MOLDED UNDERGROUND STORAGE TANK AND METHOD OF MAKING

BACKGROUND OF THE INVENTION

1. Field of the Invention

This invention pertains to underground storage tanks for containing liquid materials such as liquid fuels (gasoline, methanol and ethanol, etc.). More specifically, a double-walled underground storage tank, prepared by female molding fiberglass reinforced plastic (resin) materials is provided. The two walls of the storage tank are tied together to provide superior strength without additional thickness, and the annular material provides for flow between the walls, without the annular material itself being gas or fluid pervious.

2. Background of the Prior Art

Tanks for the containment and dispensing of liquid materials, particularly liquid fuels such as gasoline and the like, are frequently buried a short distance underground. Thus, at a common gasoline filling station for surface vehicles, a plurality of tanks will be installed in a hole which is subsequently covered over at distances up to 6 feet or more below the surface. Piping penetrating the tank extends above the surface to the dispensing means.

Prior to about the late 1970s, underground storage tanks were predominantly made of metal. The metal, being easy to fabricate and of high strength, was a natural material to use to prepare underground storage tanks. Steel, and steel alloys, are susceptible to corrosion. In any underground installation, water will be present, if in no other form, then as rain water and drainage. Many locations where underground storage tanks are installed also present the problem that the "hole" or site where the tank is installed is flooded, that is, it is "wet hole". Many times this is in costal areas, where the water present in the underground storage tank site is either ocean water, or has a high salt content and is otherwise highly corrosive. The susceptibility of steel and steel alloy tanks to failure due to corrosion is well documented.

To provide superior performance, and environmental safety, resinous plastics, and in particular, fiberglass reinforced plastics were adopted as a suitable material for underground storage tanks. Xerxes Corporation, the assignee of this application, introduced underground storage tanks made from fiber reinforced plastic in the late 1970s through the early 1980s. Underground storage tanks, be they metal or fiber reinforced plastic, are subjected to high compression, stress and shear forces. These forces can cause the underground tank to buckle, crack, or otherwise fail, allowing the liquid materials contained therein to leak into the environment. When the liquid materials are dangerous or toxic, such as gasoline fuels and the like, this poses a significant environmental problem. The cost of cleaning up leakage at such sites can be substantial, and include displacement of businesses and residents. In 1984, Xerxes Corporation introduced into commercial practice the first double-walled underground storage tank made of fiberglass reinforced resinous materials. This tank is schematically illustrated in FIG. 1. This tank was comprised of an inner shell 100, which was strengthened with circumferential ribs 102, which are distributed along the length of the tank. Along the top of ribs 102 was provided a fiberglass scrim sheet or similar material, or fiberglass fabric impregnated with resin. As cured, this provided outer tank 104. In the event of a failure of either inner containment vessel 100 or outer containment vessel 104, the material contained within inner tank 100 would not immediately be released to the environment. Leak detection systems, to detect either the presence of liquid material in the annulus formed between the two tanks, or, if the annulus was filled, that is, a wet monitor to detect, a change in the level of the liquid in the annulus, generally referred to as brine, were provided. Damage to either shell could be repaired before leakage out of the tank. Typically, each tank contains a single monitor, with flow through or some kind of communication provided between the areas bounded by the ribs. The flow through may be either through the ribs or over the ribs. Where the "flats" between the ribs are not in fluid communication, a monitor for each flat is required. U.S. Pat. No. 4,561,292, reflects a structure of this type.

Tanks of this type, that is, fiberglass reinforced plastic tanks provided with circumferential ribs for strength, can be prepared either by male molding, or female molding. The male molding method is illustrated in FIGS. 2A and 2B. In this method, the containment vessel itself, reference character 100, is prepared by "spraying up" fiberglass, that is, chopped fibers and plastic resin, on a mandrel provided with a release agent. Typically, the fiberglass and resin is provided from a spray gun, which emits both chopped fiber and resin in a fan shaped stream, from concentric nozzles. In the male molding technique, after completion of the cylindrical containment vessel 100, reinforcement ribs 102 are provided. These ribs, also comprised of fiberglass reinforced resin, are built up on molds, and adhere to the outer surface of the cylindrical tank. This method, which takes advantage of the use of tensioned strands of fiberglass wrapped around the rib and tank, is illustrated in U.S. Pat. No. 3,925,132. The result is illustrated in FIG. 2B. One problem presented by this method in these tanks is the fact that the forces imposed on the tank act on the ribs. As the ribs are attached to the tank, but not an integral part thereof, the ribs are prone to detachment, or failure, at the point of attachment to the tank.

In contrast, female molded tanks, which are illustrated in FIG. 3, are prepared by spraying up, on the inside of a mold, the chopped fiber and resin. When the resin is cured, the mold is opened, and the containment vessel, with ribs integral therewith, as illustrated in FIG. 3, is provided. As the ribs are not attached to the outer surface of the tank, but rather constitute an element of the containment tank itself, the ribs are not subject to delamination or failure, in the same mode that the male molded tanks are. The female molded tank in FIG. 3 has been illustrated with the ribs open. This is not a structure having sufficient independent strength, without making the walls excessively thick. In practice, ribs are closed, by extending a ply of fabric, generally a uni-directional non-woven fiberglass fabric, across the opening at the base of the rib, and "glassing it in", that is, overspraying with fiberglass reinforced plastic to adhere the fabric to the inner surface of the tank at the "shoulders" of the rib. Other methods for closing off the rib are known including spraying up over forms inserted in the ribs.

Because the female molding process imposes limitations on materials and steps that can be practiced, as the materials and steps taken must be practiced within the mold, and applied outwardly, female molding may not be as adaptable to certain modifications as male molding.

The double-walled tank illustrated in FIG. 1, and introduced in 1984, had an annulus of substantial dimension. The distance between the two tanks, the height of the rib, may be as much as two inches. The resulting annulus has a greater volume than the interior of the containment vessel. This imposes costs in a variety of ways. In addition to a substantial amount of brine or other annular liquid for wet monitors, the containment capacity, that is, fuel capacity, for any given tank of given dimension and materials, is necessarily reduced. Additionally, because of the weight of the amount of annular liquid required, the tank must first be installed, and the annulus filled with liquid by pumping it, on site, into the annulus through an opening provided in the outer tank. This is a costly and inefficient method.

Beginning about 1988, steps were undertaken to provide a double-walled fiber reinforced underground storage tank of reduced annulus. This was done by providing a liquid/gas pervious material between the two tanks, such as a plastic netting or similar material, but otherwise providing "contour matching" between the tanks. In the male molded version, this involves placing the liquid pervious material on the surface of the first-formed vessel, and then forming a second wall, or at least wall portions, thereover. A description of this kind of tank appears in U.S. Pat. No. 4,739,659. This tank has never been commercially produced. One problem is the difficulty in overlaying the porous material with a layer of fiberglass reinforced resin. Either the material presents a smooth surface, which excludes the resin material from its interior, or the liquid pervious material is open. If closed, presenting a smooth surface, it is difficult to secure adherence of the sprayed resinous material to the surface. As the mandrel is rotated, the material tends to "spin off". In the alternative, the liquid pervious material is open, but becomes rapidly filled with resin applied thereto, thus endangering the flow properties of the liquid, and making it difficult or impossible to monitor many portions of the tank.

Additional problems are presented in building a double-walled tank. In the 1984 original double-walled tank, the two tanks were essentially independent, and each had to be strong enough to resist the forces applied. In 1989, Xerxes Corporation commercially introduced a double-walled tank, referred to as the DWT-II tank, which modified the original DWT-I by applying plastic netting to the interior of the outer or first-formed female molded tank. This netting was "locked into place" with additional fiberglass material. Thereafter, an interior cylindrical tank was formed, and tied to the outer tank through the fiberglass locking in the netting. Plastic netting of this type, generally a thermoplastic, is resistant to bending. It was difficult to ensure that the plastic material extended to all areas, particularly in the dome. The resulting tank was strong, durable, and environmentally sound, but required considerable expertise to form. The netting material, that is, liquid pervious material, also occupies substantial space, making the annulus thicker then is necessary for containment and monitoring purposes. Ideally, only a space necessary to provide for flow of liquid material between the two tanks should be necessary for monitoring and containment.

An alternative approach is illustrated in U.S. Pat. No. 5,220,823. In this approach, a liquid pervious mat or felt is placed between the two shells, which transmits load between the two shells and thereby "ties" the two shells together, in terms of strength. While this approach has independent advantages set forth in that commonly assigned patent, it again presents an annulus of significant thickness, and, particularly in the manufacture of a female molded tank, requires application of felt to the interior of the tank, and adherence to the interior of the external shell, followed by application of the interior shell in a way that adheres to the interior surface of the mat or felt. This generally requires the use of additional adhesives, which complicates a process which already employs sprayed resin and catalyst.

Accordingly, it remains an object of those of skill in the art to provide a double-walled underground storage tank, comprised of fiberglass reinforced resinous materials, which has an annulus of reduced dimension (volume) wherein the shells are tied together to share strength and reduce overall thickness, which can be effectively monitored and provide effective dual-containment for fuel or other hazardous materials contained therein.

SUMMARY OF THE INVENTION

The above objects, and others more fully illustrated by the disclosure set forth below, are achieved by providing a flood coat on the interior of a conventional outer shell of a female molded tank, and, before drying of the flood coat, applying thereto a non-porous layer of plastic film, such as polyester (nylon) film. The film runs from the end of one rib to the beginning of the next rib, or over the "flats" of the interior surface of the outer tank. This film, which constitutes the entire thickness of the annulus, is "locked into place" by applying fiberglass reinforced plastic materials around the "rib radius" or junction between the flat and integral rib. In practice, the annular fluid flows in the annular space created by teh film, not through the film, but on it. For convenience, the resinous material used to lock the annular material into place may be sprayed from a point just prior to the beginning of the rib, into the rib interior, along the opposite surface of the rib and to a point on the next adjacent flat just beyond the rib/flat joint. The rib is then closed, by applying a layer of uni-directional fiberglass fabric across the open base of the rib, and "glassing it on to" the material used to lock the annular film in place, or "half-rib pass".

Gutters are installed along the length of the tank, by placing a strip of porous material along the longitudinal length of the tank interior at three paths, after punching holes along each path through each rib base and flat. The gutters provide communication between all areas of the annulus, and ensure constant monitoring of the entire tank annulus. Thereafter, an inner, cylindrical shell is sprayed up on the surface formed.

The annular film material does not extend into the dome. Instead, wax is applied to the interior surface of the dome of the outer shell, together an application of an alcohol such as PVA. The combination of these layers acts as a separator, providing a space between the two shells in the dome. The wax and alcohol are applied prior to formation of the inner cylindrical shell.

The resulting tank has superior strength, due to the tie between the inner and outer shell, with an annulus of paper thin thickness. Fluid communication between the domes, each flat, and each rib space, is provided by the gutter. Difficulties encountered in working with materials which must be liquid pervious in curved areas are avoided, the superior robustness of a female-molded tank is provided, and a reduced annulus, and therefore enhanced capacity, is similarly provided.

BRIEF DESCRIPTION OF THE DRAWINGS

This invention can be more clearly understood by reference to the figures submitted herewith, in which like reference characters indicate like parts.

Figure 3:
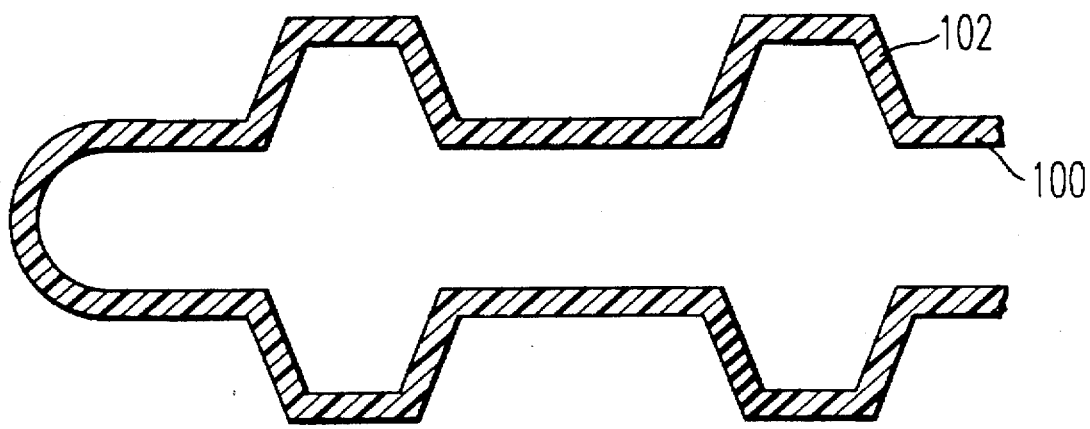
Figure 4:
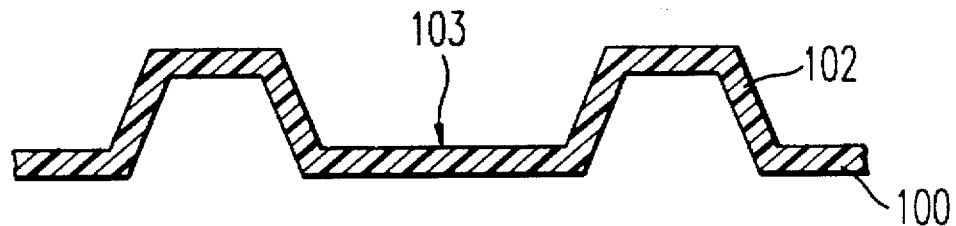

A female molded FRP tank shell, with integral ribs is illustrated in FIG. 3.

FIGS. 4–7 illustrate sequential steps in the production of the inventive underground storage tank. In each of these figures, two ribs, and the associated flat areas are illustrated. It should be understood that depending on the length of the tank, more ribs and flats will be provided, but will be prepared in exactly the same fashion. As the tank is female molded, each section ultimately terminates in a dome shaped end, as illustrated in FIG. 9.

Figure 8:
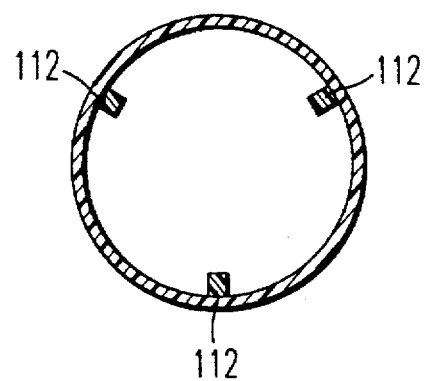

FIG. 8 is a transverse cross section through the tank, showing the placement of gutters.

FIG. 9 is an illustration of a portion of the inventive tank formed according to the method of this application.

DETAILED DESCRIPTION OF THE INVENTION

This invention can be more fully understood by reference to the drawings that accompany this application. The invention is described below, first in terms of the sequential steps employed in production of the inventive underground tank. After the method is described, the resulting underground tank is described. For purposes of clarity, only a portion of the tank has been illustrated. The tank is conventionally made in two halves, the two halves being married together by application of additional fiberglass reinforced resin about the seam thereof. After the halves are married, additional fittings, manways, and the like may be cut through one or both shells in the annular material. Monitors used to monitor pressure, liquid or contaminants in the tank are conventional in the art, and do not constitute an aspect of the invention claimed herein, per se.

The process of female molding of the tank begins with the formation of the exterior integral shell. Thus, the shell illustrated in FIG. 3 is formed. This step is more fully illustrated in FIG. 4, in terms of two ribs and the associated flats, where flats 100 flow into ribs 102, which are formed integrally therewith. These are formed against a mold (not illustrated) generally provided with a conventional release agent. The exterior shell 103 is generally comprised of three discreet parts, repeating flats 100, separated by an integral with ribs 102, which terminate into dome-shaped ends, as shown in FIG. 3. This shell is prepared by spraying up against the mold a combination of chopped fiberglass and resin pre-polymer, combined with a catalyst. The resin cures in place, providing a hard, smooth-finished shell that is not subject to corrosion, and substantially water tight. To ensure water tightness, and to provide for the next stage in processing, a flood coat of pure resin is applied to the interior of exterior shell 103. The flood coat, as applied, is tacky.

It should be noted that the chopped fiberglass and resin employed in the construction of the inventive tank is conventional. Suitable fiberglass can be obtained from traditional suppliers of such materials, such as Owens-Corning Fiberglas and Pittsburgh Plate Glass. A wide variety of resin materials are available, and will be selected based on the materials to be contained, and whatever unusual materials may be in the environment in which the tank is to be used. Exemplary resins may be obtained from Reichold Chemical, Inc. Other resins are available.

Application of Annular Film

Figure 5:
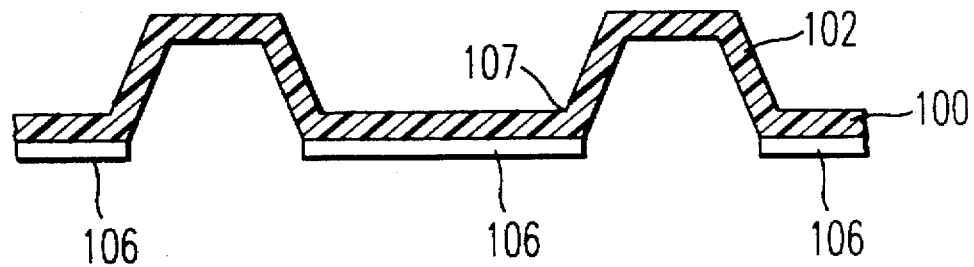

While the flood coat is still wet, the annular film material 106, as illustrated in FIG. 5, is applied. The flood coat is sufficient to hold the annular material in place. As the annular material is not porous or liquid pervious, or gas pervious, in nature, but rather comprises a plastic film, concerns about "filling" the annular material, or otherwise preserving a porous nature, are ovulated. Any thin plastic film is suitable for use in the claimed invention. Polyester films are preferred. An exemplary film, sold as mylar film, can be obtained from Qualis, Inc. of Henderson, Kentucky. Virtually any workable film can be used in its place. The film extends, and is applied against the flood coat, of each flat, circumferentially around the interior of the tank. It is important that the film extend to the "shoulder" between each rib and each flat, to preserve the double-wall character of the tank, which is discussed below. Where the width of the film is not equal to the width of the flat to which it is applied, sheets of film should be overlapped along each flat. The film is trimmed so that it extends to rib shoulder, or "rib radius" 107, and not beyond. The thickness of annular film 106 is generally much less than 1 mil, and may be as thin as the material permits, while retaining the ability to be applied to the interior of the tank.

It should be noted that the film is not applied to the dome of exterior shell 100. It is also important to note that film 106 does not extend into the interior of ribs 102.

Preparation of Tie-Ins

Figure 6:
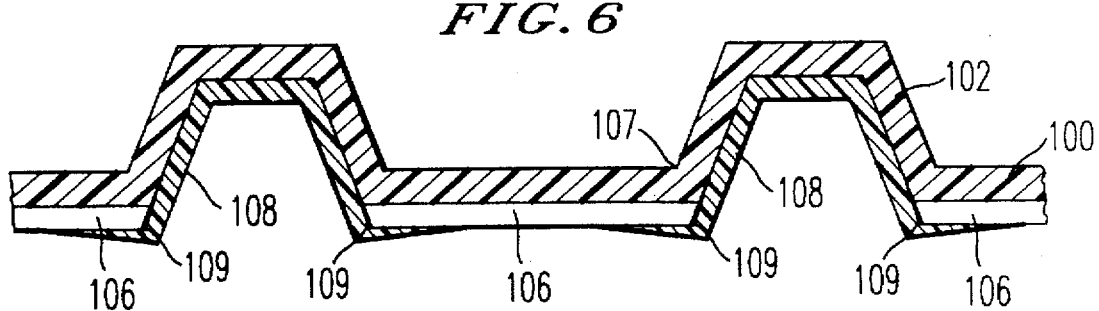

In the next step, illustrated in FIG. 6, fiberglass reinforced resin material is applied around the rib radius, to both "lock" film 106 in place as the flood coat dries, and to serve as a method for tieing exterior shell 100, structurally, to the interior shell or containment vessel to be formed. Thus, fiberglass resin material is applied over film 106, in the areas of the flat adjacent each rib. This material may be referred to as "half-rib pass", if the material is extended into the interior of rib 102, along its top, down the other side and out over the adjacent rib radius. While this is not absolutely required, it provides a convenient method for ensuring adequate thickness of material in the structural ribs. Tie-ins 108 do not extend across the flat of the exterior tank, and do not constitute containment elements. They serve the dual function of locking the annular film material in place, and providing a "mount", or means for connecting the inner cylindrical tank, the primary containment vessel, to the outer structural secondary containment vessel.

Formation of Gutters

Figure 7:
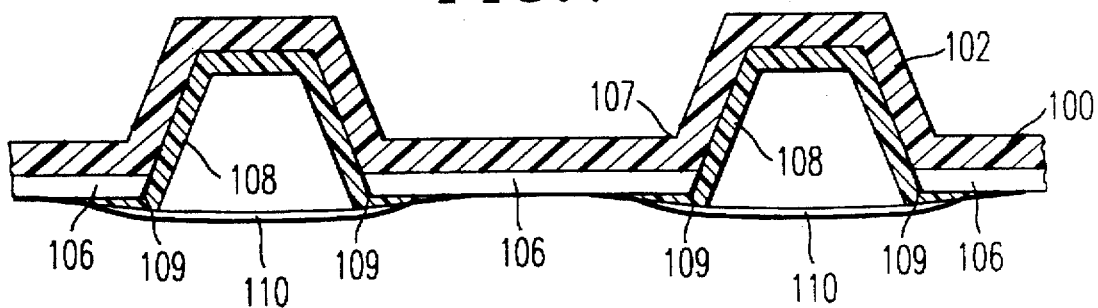

In the next step, the base of the rib is closed, by providing a length of uni-directional fabric circumferentially around the base of the rib, from tie-in to tie-in. The fabric is adhered to the tie-ins by additional fiberglass-reinforced resin, which is sprayed over the entire uni-directional fabric, and onto the tie-ins themselves. As illustrated in FIG. 7, at this point in the construction of the tank, the interior of each rib is closed off from adjacent flats and ribs. As the interior of the rib constitutes a portion of the secondary containment, together with the flats of the exterior tank, it is important that all portions of the to-be-formed annulus, and the interior of the ribs, be in fluid communication if a single monitor is used. To achieve this, gutters extend along the interior of the tank longitudally. The gutters extend along the tank in one or more locations, to insure full liquid communication. As illustrated in FIG. 8, gutters 112 may be placed along the tank equally spaced. Other spacings will occur to those of skill in the art.

Preparation of the Dome

As noted above, annular film 106 does not extend across the dome. Rather, the interior surface of the dome of the exterior containment vessel maybe coated with wax, and then a wax/alcohol formulation, to act as a separating agent such that the dome of the exterior containment vessel, and the interior primary containment vessel, separate after formation. Liquid PVA as a suitable alcohol is widely available. One suitable alcohol is obtained from Rexco Company of California, under the mark X-08. The Rexco X-08 alcohol is particularly suitable for this application, but other alcohols can be selected. After application of a PVA film to the dome, a wax/alcohol layer is applied. This layer, a highly viscous material, is also available from Rexco, as Partall Paste No. 2. Other paste polishing waxes may be prepared from a semi-solid wax and alcohol, such as PVA. The wax serves to hold the alcohol, to provide a uniform separating agent across the dome. This material is applied across the entire interior of the dome, taking care not to intrude over rib surfaces and the remainder of the exterior tank.

The tank is now ready for the formation of the gutters. Gutter placement is first noted by applying a tape strip along the length of the tank, extending from the dome, to the outer edge of the half-tank formed in the mold. A hole is formed at each flat, and at each rib, through to the annulus. After the holes are formed, a thermoplastic netting material, or other liquid passing material, is layed over the holes formed, to define the gutter. Since the gutter is laid in a straight line, continuously along the length of the tank, handling problems are reduced or eliminated. A suitable porous material is available from Qualis, Inc. and is generally a thermoplastic netting referred to in the industry as "railroad tracks". This material can be replaced by other suitable materials, including fabric, felts, and other porous materials. The gutter is held in place with tape, and then covered with a fiberglass textile referred as woven roving, a woven fiberglass material widely used as non-directional structural fabric. The woven roving is glassed into place with FRP.

Primary Containment Vessel

The tank is now ready for formation of the interior, primary containment vessel 114, as illustrated in FIG. 9. This vessel is a smooth cylinder, formed of FRP blown up against the interior surface of the exterior tank, annular film, tie-ins, rib base, and inner dome coating as described above. Because the FRP of the inner tank bonds with the FRP of the tie-ins, a direct structural bond between the inner tank and the outer tank through the tie-ins exists. This reduces the necessary thickness for the inner tank, as it borrows strength from the exterior, secondary containment tank. The interior of the secondary containment tank is provided with a flood barrier of various resins, selected on the basis of the fluid to be contained there within. Any of a wide variety of resins can be selected for construction of the tank, both the FRP materials, the various flood coats and barriers. Typical resins are polyester resins, such as vinyl esters, isophthalic polyesters, polyurethanes, and combinations thereof. Polyethylene, PVC and polyapoxide resins can similarly be used, as well as a wide variety of "tailored" resins, depending on the materials to be used and the environment to be encountered.

For purposed of clarity in FIG. 9, rib base 110 has been illustrated with an exaggerated curuature and thickness. In formation, it is relatively thin, and the inner primary containment tank is of uniform thickness.

Double Containment

Figure 1:
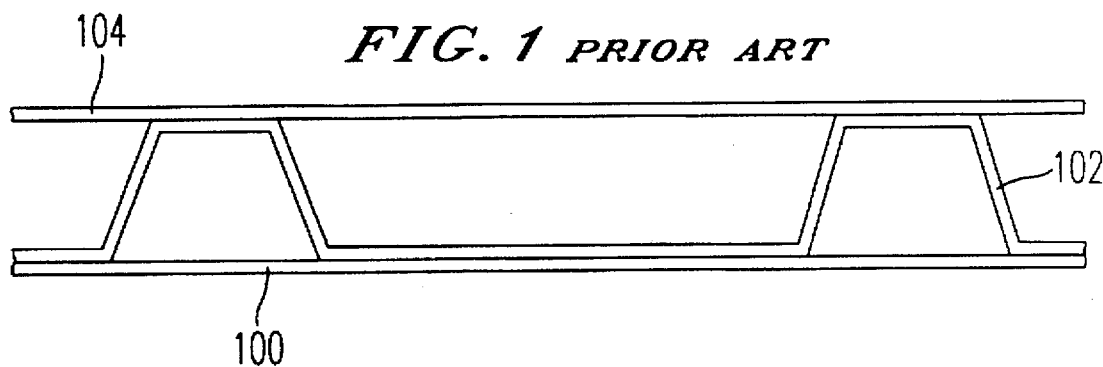
FIG. 1 is an illustration of the ribs and shell structure of the first double-walled fiberglass reinforced underground storage tank introduced in 1984.
Figure 2A:
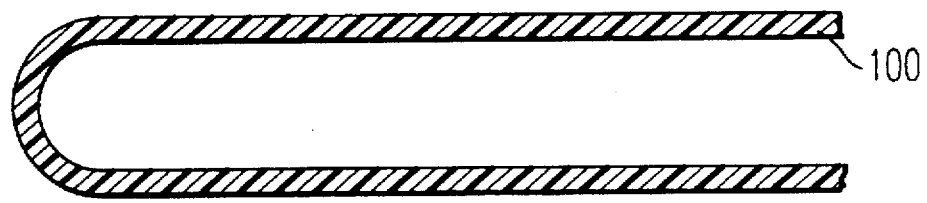
FIG. 2A illustrates the formation of a fiberglass reinforced plastic (FRP) tank formed on a male mold, with application of the ribs thereto being illustrated in FIG. 2B.
Figure 2B:
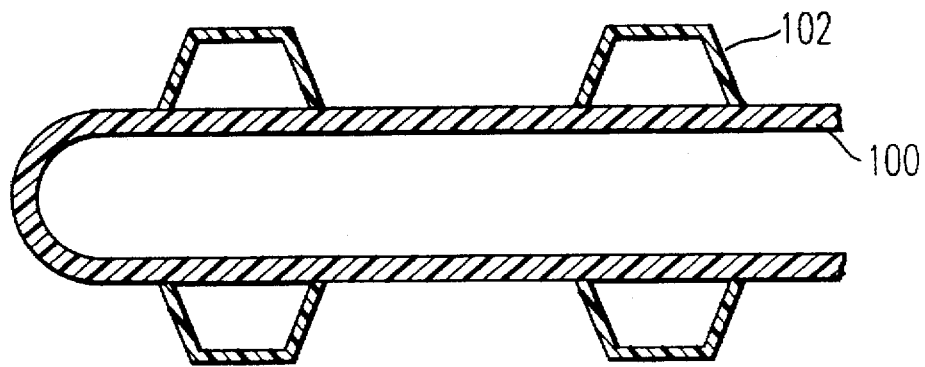

As noted in the outset, it is essential that double containment be provided throughout the tank. If, at any point along the length of the tank, a line normal to the surface of the interior tank can pass through the exterior tank without first passing through a space of some type, the tank does not meet the exacting standards required for double containment. Thus, tanks such as those described in U.S. Pat. No. 4,739,659, cannot meet this exacting standard. As illustrated in FIGS. 1 and 2 thereof, a line is easily passed from the interior tank, through the rib, without passing through a space. Many male molded tanks experience this problem at the junction between the rib and the tank, and this can be a problem for female molded tanks as well, particularly at junction 107. Dual containment is a assured in the inventive tank, by reason of the use of the annular film 106, and tie-ins 108. As noted, annular film material 106 must extend to the shoulders of each rib adjacent the flat on which it is placed. Application of tie-ins 108 will tend to cause annular film 106 to bend towards the interior of the rib. The material exhibits some resistance to this bending force. The result is that the FRP material of tie-in 108 "bends around" the annular material, forming a small "knuckle" or air space 109. This is an inherent feature of the processing using the annular film 106 and tie-ins 108, but a necessary quality guarantee of dual containment along the length of the tank.

As described, the annular film 106 is applied against the wet flood coat on the interior face of the exterior secondary containment vessel. Additionally, portions of the annular film are in contact with the inner primary containment FRP tank. In general, upon drying of the flood coat, and curing of the inner tank, the annular material is released, sufficient to create a space between the inner and outer tanks. Similarly, the alcohol and wax placed in the domes creates a space there between. To ensure release of the annular film, and dual containment throughout, however, mild pressure may be applied to the annulus of the tank, by applying a pressure of one end to one or more of the gutters. A pressure of 2–3 psi is sufficient to ensure that the annular material "pops free" from either the inner or outer shell, creating the necessary space. Liquid, either intruding from a failure in the exterior tank, or a failure in the interior tank, flows along annular film 106, but not there through. Similarly, the pressure applied ensures that an annular space is formed in the dome, due to the releasing action of the wax and alcohol such as PVA. This application of a mild pressure to the annulus, substantially below that which the gutter can withstand without separating from the inner shell of the exterior tank or otherwise failing, provides another quality assurance and dual containment guarantee.

The Completed Tank

The tank is now completed, in two half shells. These shells are "married", by application of a seam of FRP, having been released from their molds. At this point, openings for various fittings, manways and the like can be introduced into the tank, as necessary. Additionally, one or more monitors can be provided, and if necessary, an annular fluid reservoir is built onto the tank. Once openings have been made, and fixtures attached and sealed, the annulus can be filled with brine, if, as is popular, the annulus is to be "wet", that is, liquid filled. Only a very limited volume, depending on the diameter of the tank, is necessary to completely fill the annulus, thus making it possible to fill the annulus at the factory, rather than on site. No significant additional weight is added for transportation purposes.

The resulting tank takes advantage of the enhanced robustness of female-molded FRP tanks. It is provided with dual containment throughout the tank. It is manufactured without the need for attention to the problems encountered in using or porous of flow through material, save at the gutters, which extend in a straight line only. The tank, by reason of the strength sharing between the inner and outer containment vessels, is of reduced overall weight and thickness. Total thickness of each shell, and the total weight of the tank, will vary according to the need and specification, as well as the size of the tank, but are substantially reduced over prior models. The tank is equally suited for use with wet monitors, where the amount of liquid present in the annulus is monitored, and a change in the level of liquid indicates preliminary failure in one containment vessel or the other, and dry annulus, where a monitor is provided to determine the presence of liquid in the annulus, or a change in the pressure in the annulus. Such monitors are conventional to those of skill in the art.

This invention has been described both generically, and with reference to specific embodiments. Variations will occur to those of ordinary skill in the art without the exercise of inventive faculty. In particular, different resins, fiberglass, annular films, alcohols and waxes are bound in the art, and can be substituted without inventive skill. Dimensions and specific shapes, as illustrated, are for reference purposes only, and not limiting unless so indicated. These variations remain within the scope of the invention as disclosed, save as excluded by the recitation, of the claims set forth below.

What is claimed is:

1. A method of making a female-molded double-walled underground storage tank, comprising the sequential steps of:

Forming an exterior, secondary containment shell of fiberglass reinforced plastic having the shape of one-half of a cylinder with integral, circumferential fiberglass reinforced plastic ribs extending outwardly therefrom with regions there between termed flats, said half cylinder being open at one end and terminating in a closed dome-shaped end at the other, Applying a coat of resin on the interior surface of said flats of said exterior secondary containment shell, Applying a film of non-porous material over said coat of resin while said coat is wet, said film extending over the entire length of each said flat to, but not across, each rib bounding said flat, Forming fiberglass reinforced plastic tie-ins on at least a portion of the interior of each said rib and continuing over a portion of said annular film adjacent each said rib, wherein said tie-in does not extend over the entire width of said annular film, Applying a layer of structural fabric from one end of each said film applied to the interior of said flat to the next, and from said dome to the annular film closest to said dome, and applying fiberglass reinforced plastic to said fabric, so as to close off the interior of each said rib, Applying a layer of alcohol and wax to the interior of said dome-shaped end, Forming an interior fiberglass reinforced plastic primary containment tank by applying fiberglass reinforced plastic onto to said tie-in, annular film and alcohol and wax coated dome to form a half cylinder structurally bonded to said secondary containment shell through said tie-ins, and Marrying the half-cylinder formed by said process to another said half-cylinder at their respective open ends, and forming an fiberglass reinforced plastic seam around said married ends.

2. The process of claim 1, wherein subsequent to said step of applying alcohol and wax to said dome-shaped end, a plurality of gutters are formed along the length of the interior of said tank, said gutters placing the interior of each said rib and each flat in fluid communication with each other and said dome.

3. The process of claim 2, wherein said gutters are formed of a thermoplastic netting.

4. The process of claim 2, wherein, subsequentive said step of forming said interior fiberglass reinforced plastic primary containment tank, mild pressure is applied to each said flat and said dome-shaped end to ensure separation between said exterior secondary containment shell and said interior primary containment tank.

5. The method of claim 4, wherein said pressure is applied through said gutters.

6. The method of claim 1, wherein said step of applying a layer of structural fabric comprises applying a layer of uni-directional fiberglass fabric comprised of fiberglass yarns over said interior of said rib, said fiberglass yarns being oriented in the direction of the longitudal axis of said tank.

7. The method of claim 1, wherein, in the process of forming said tie-ins, a knuckle of air space is formed between said tie-ins and that portion of each rib to which it is attached adjacent said flat, with said tie-in being bonded to each said rib above said air space.

8. A female-molded double-walled underground storage tank prepared according to the process of claim 1.

9. A female-molded double-walled underground storage tank, comprising:

A cylindrical exterior secondary containment shell comprising opposed dome-shaped ends and circumferential integral support ribs spaced along the length of said shell between said dome-shaped ends, said ribs each having an interior closed by a layer of fiberglass reinforced plastic at the base of each said rib, with regions termed flats between said ribs, Annular film material on the interior surface of each flat of said exterior secondary containment shell, and A cylindrical inner primary containment tank with dome-shaped ends within said exterior secondary containment shell and bonded thereto by fiberglass reinforced plastic tie-ins bonded to said exterior secondary containment shell and said inner primary containment tank, said underground storage tank comprising an annulus between said exterior secondary containment shell and said interior primary containment tank.

10. The double-walled underground storage tank of claim 9, wherein said respective dome-shaped ends of said exterior secondary containment shell and said inner primary containment tank are separated by a space there between.

11. The tank of claim 9, wherein said space between said exterior secondary containment shell and said inner primary containment tank dome-ends, said rib interiors, and said flat regions where said inner primary containment tank and said exterior secondary containment shell are separated by said annular film are all in fluid communication.

12. The tank of claim 11, wherein said fluid communication is effected by a gutter comprised of a length of porous material which extends along the entire length of said tank from one dome-shaped end to the opposed dome-shaped end between said exterior secondary containment shell and said interior primary containment tank.

13. The tank of claim 9, wherein, at all points along the exterior surface of said inner primary containment tank, a line drawn therefrom outwardly, passes through a space before passing through said exterior secondary containment shell.

* * * * *